(12) United States Patent
Chelin et al.

(10) Patent No.: US 8,434,724 B2
(45) Date of Patent: May 7, 2013

(54) AIR OUTLET SYSTEM FOR AIRCRAFT LEADING EDGE

(75) Inventors: Frédéric Chelin, Encausse (FR);
Thierry Surply, Cornebarrieu (FR);
Christophe Bourdeau, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 229 days.

(21) Appl. No.: 12/745,950

(22) PCT Filed: Dec. 1, 2008

(86) PCT No.: PCT/FR2008/052165
§ 371 (c)(1),
(2), (4) Date: Sep. 14, 2010

(87) PCT Pub. No.: WO2009/077689
PCT Pub. Date: Jun. 25, 2009

(65) Prior Publication Data
US 2010/0327120 A1  Dec. 30, 2010

(30) Foreign Application Priority Data

Dec. 3, 2007 (FR) ...................................... 07 59494

(51) Int. Cl.
*B64C 21/04* (2006.01)
*B64D 15/02* (2006.01)

(52) U.S. Cl.
USPC ...................... 244/207; 244/53 B; 244/134 B

(58) Field of Classification Search ................ 244/53 B, 244/207, 210, 134 B, 208, 209, 200, 200.1; 137/15.1; 60/39.093; 416/90 R, 90 A, 231 B; 181/214
See application file for complete search history.

(56) References Cited

U.S. PATENT DOCUMENTS

| | | | |
|---|---|---|---|
| 3,840,199 A * | 10/1974 | Tibbs | 244/207 |
| 3,889,903 A * | 6/1975 | Hilby | 244/207 |
| 3,933,327 A | 1/1976 | Cook et al. | |
| 4,154,256 A | 5/1979 | Miller | |
| 4,738,416 A | 4/1988 | Birbragher | |
| 4,749,151 A * | 6/1988 | Ball et al. | 244/53 B |
| 5,841,079 A | 11/1998 | Parente | |
| 6,131,855 A * | 10/2000 | Porte | 244/134 B |

FOREIGN PATENT DOCUMENTS

| | | |
|---|---|---|
| EP | 0 934 878 | 8/1999 |
| EP | 1 156 962 | 6/2004 |
| WO | 2007/007108 | 1/2007 |

OTHER PUBLICATIONS

International Search Report dated Jul. 6, 2009, from corresponding PCT application.

* cited by examiner

*Primary Examiner* — Tien Dinh
*Assistant Examiner* — Richard R Green
(74) *Attorney, Agent, or Firm* — Young & Thompson

(57) ABSTRACT

An aircraft leading edge is extended by an aerodynamic surface providing an aerodynamic flow and where air discharges are arranged preventing separation of the aerodynamic flow. The air discharges are arranged in at least two rows essentially parallel to the leading edge and in an offset manner for at least two consecutive rows. At least one block is inserted between two walls that form the aerodynamic surface. The block includes, on the one hand, an outside surface extending the aerodynamic surface, a first inclined surface contacting the first wall forming the aerodynamic surface, and a second inclined surface contacting the second wall that forms the aerodynamic surface, and, on the other hand, projecting and/ or hollow shapes that are made at the inclined surfaces and that are arranged in an alternating fashion from one surface to the next, allowing air to pass on both sides of the aerodynamic surface.

20 Claims, 3 Drawing Sheets

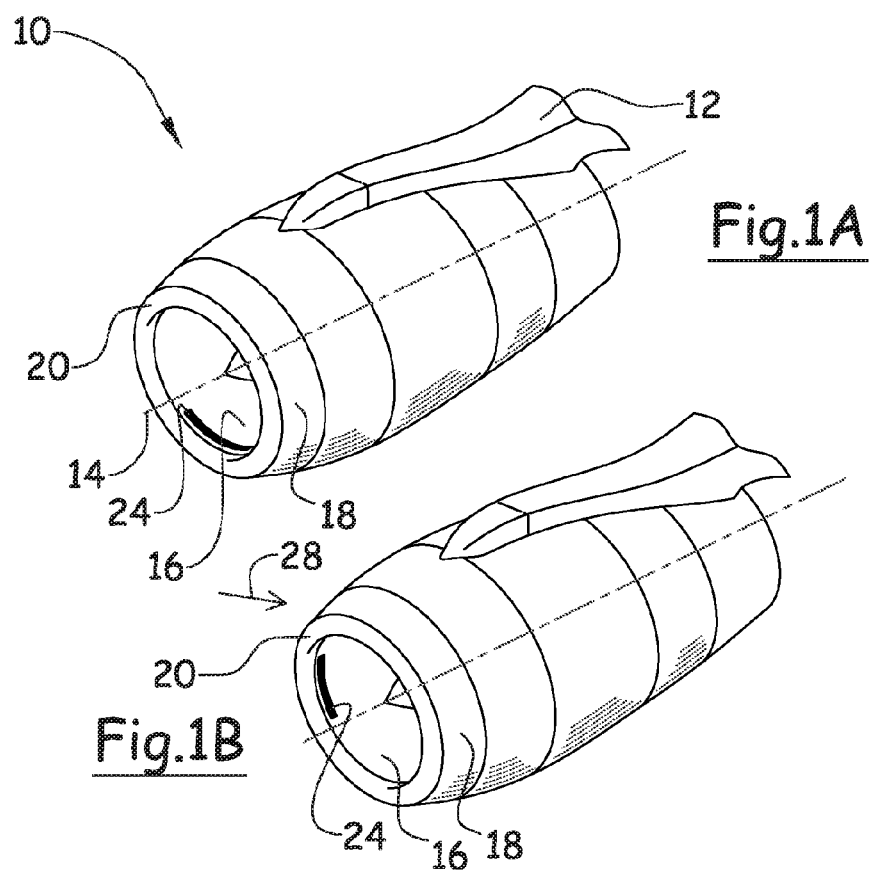
Fig.1A
Fig.1B
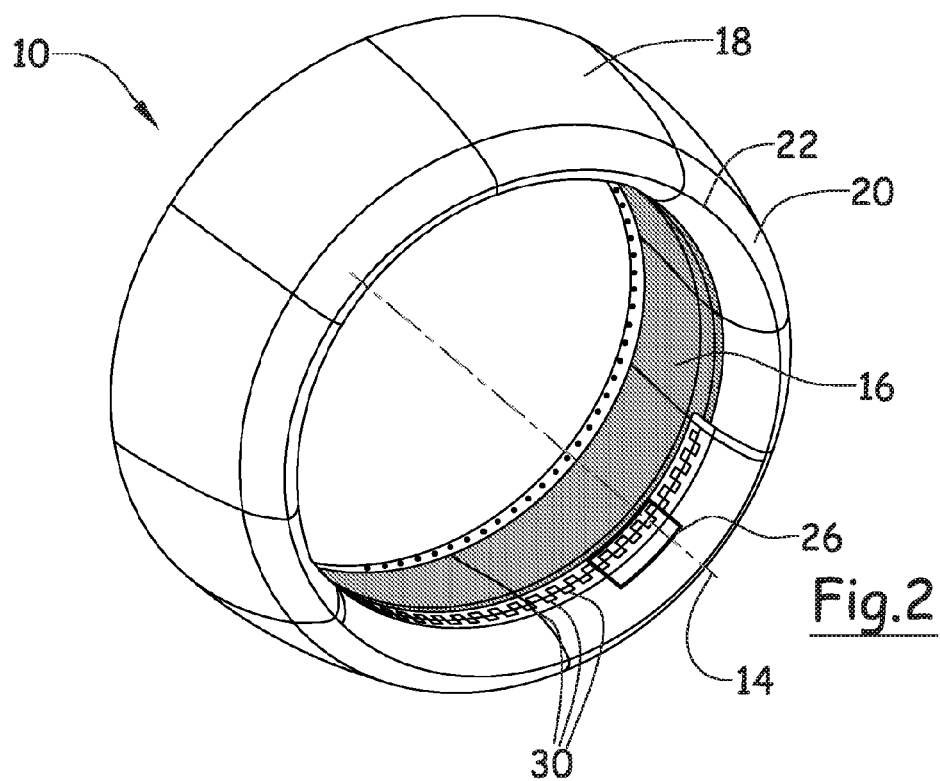
Fig.2

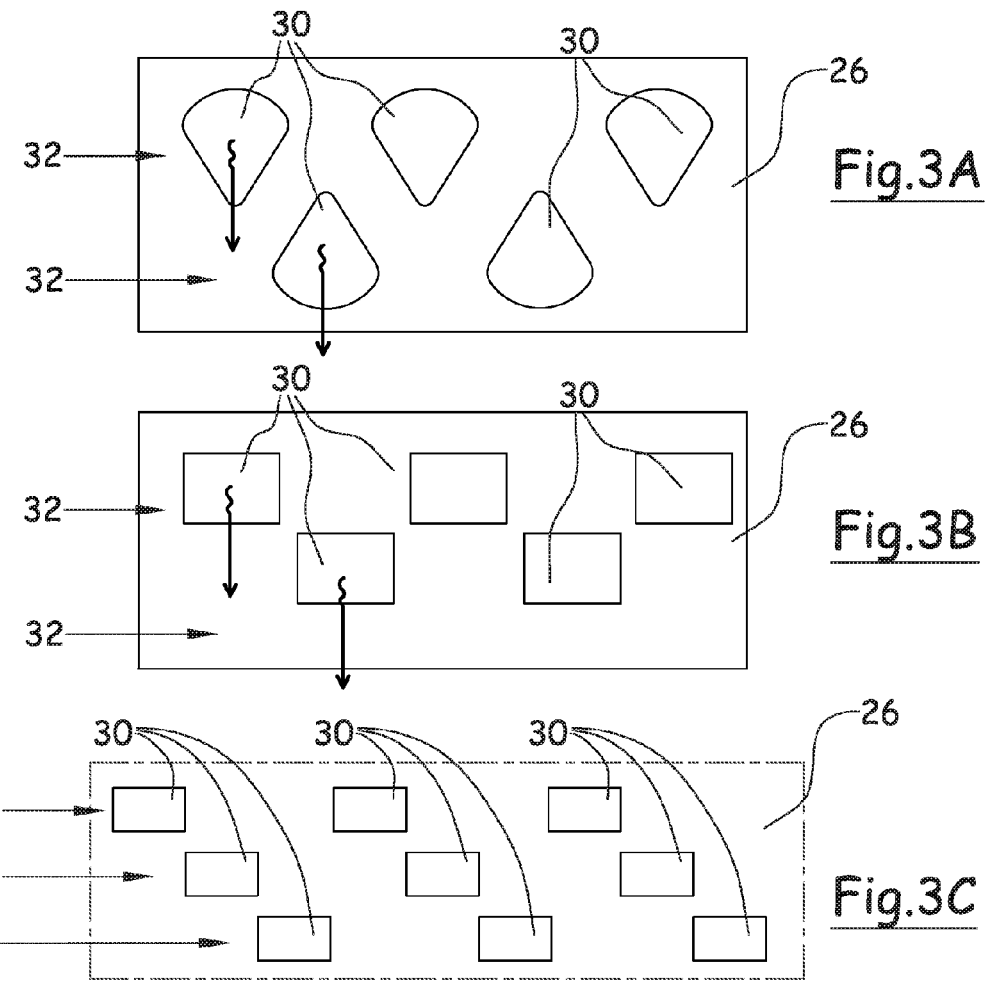
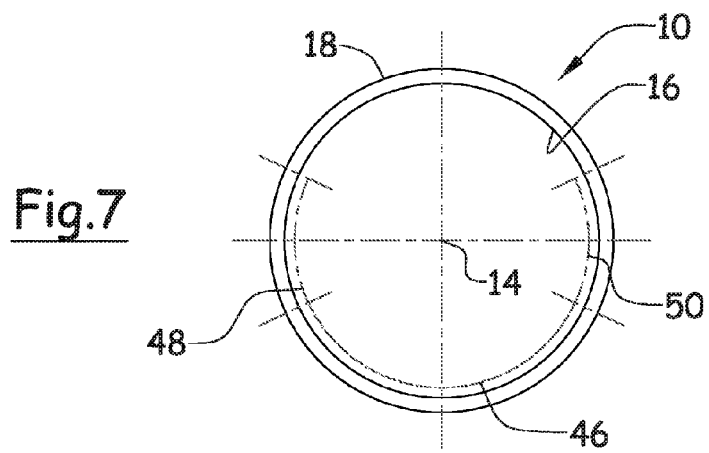

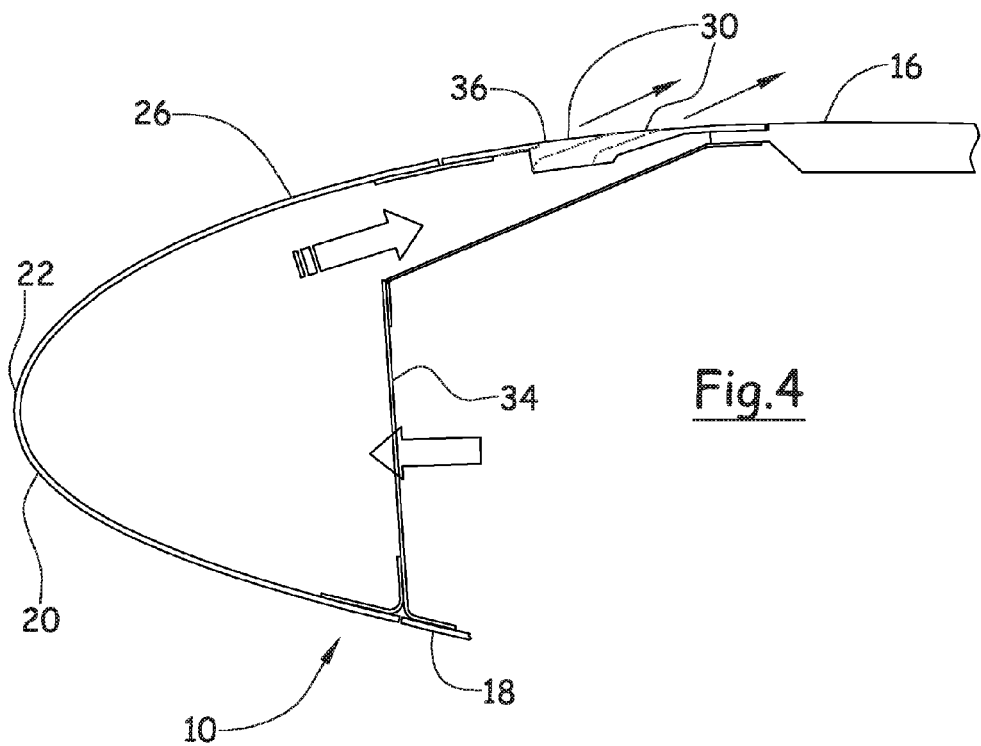
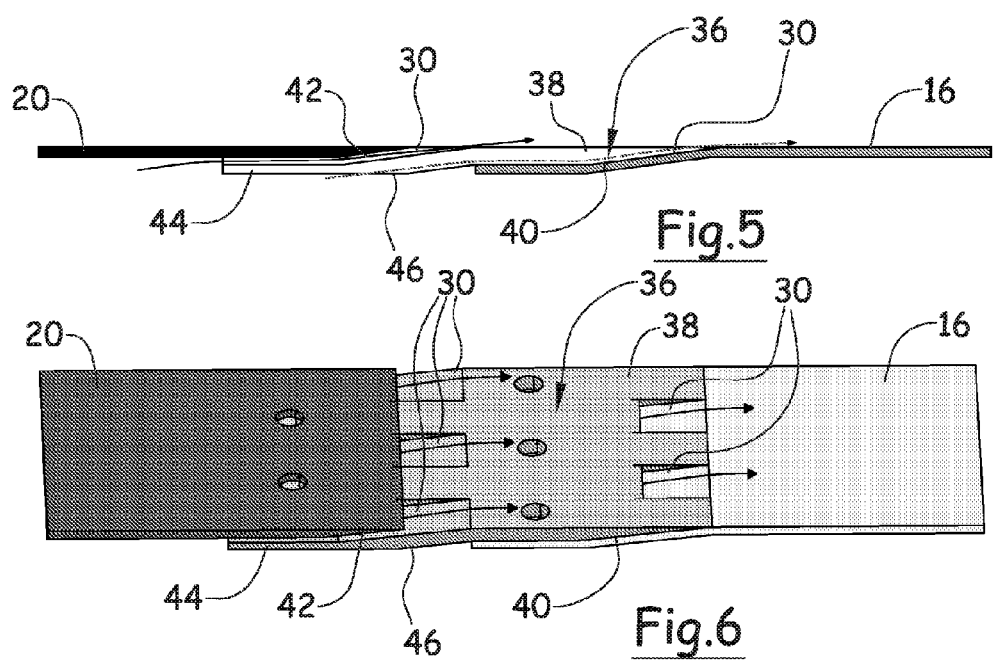

AIR OUTLET SYSTEM FOR AIRCRAFT LEADING EDGE

BACKGROUND OF THE INVENTION

1. Field of the Invention

This invention relates to an air discharge system for an aircraft leading edge, more particularly adapted to the leading edge of an aircraft nacelle, whereby said system makes it possible to limit the risks of separation of the air flow from the aerodynamic wall that originates in particular from the variation of the angle of attack of the aircraft and/or the orientation of wind gusts.

2. Description of the Related Art

An aircraft propulsion system comprises a nacelle in which a power plant, connected by means of a mast to the rest of the aircraft, is arranged in an essentially concentric manner.

The nacelle comprises a first wall that delimits a pipe with an air intake at the front, a first part of the incoming air flow, called primary flow, passing through the power plant to assist in the combustion, and the second part of the air flow, called secondary flow, being driven by a fan and flowing into an annular pipe that is delimited by the first wall of the nacelle and the outside wall of the power plant.

The nacelle also comprises a second so-called outside wall with essentially circular sections that extends from the air intake to the rear discharge, constituted by the juxtaposition of several elements as well as a lip, creating the air intake, connecting the first wall and the second wall.

Hereinafter, the longitudinal axis of the nacelle corresponds to the shaft of the power plant.

When the air flow entering the nacelle is oriented at a significant angle relative to the longitudinal axis of the nacelle, this creates a separation phenomenon of the air flow relative to the aerodynamic surface. This phenomenon has consequences on the proper operation of the engine. The separation of the air flow is characterized by a zone for reversal of the direction of the flow. The beginning of this zone corresponds to a line that is essentially perpendicular to the primary direction of the flow, called separation line below.

This separation phenomenon may appear both on the ground, in particular during takeoff phases by crosswind, and in flight, in particular during maneuvers with high impact at low speed.

During these phases, the separation line extends inside the air intake over a part that is more or less extended circumferentially, generally located in the upper or lateral part under stationary point or takeoff conditions and in the lower part under flight maneuvering conditions.

Thus, according to a common embodiment, the size of the nacelle as well as the thickness of the profiles of the front part of the nacelle are defined based on these operating conditions. A penalty results on the performance of the nacelle under other flight conditions, in particular during cruising.

According to the flight conditions, the wind direction on the ground, the speed and the angle of attack of the aircraft in flight or the engine speed, the position of the separation line is variable. Thus, for example, the higher the angle of attack, the closer this separation line comes to the front part (leading edge) of the air intake, while the higher the speed of the aircraft or the engine speed, the farther it moves away.

According to the document EP-1,156,962, a technique is known that makes it possible to prevent the separation of an aerodynamic flow from a wall that consists in injecting an air flow, essentially tangential to the wall, in a direction that is parallel to the aerodynamic flow, to the right or just downstream from the separation line. By adjusting the aerodynamic characteristics of the injected air flow, the risks of the separation phenomenon appearing are limited.

According to this document, the injection points of the air flow are arranged along a line that is essentially parallel to the separation line.

Consequently, as for the geometric shape, this solution for preventing the appearance of the separation phenomenon makes it possible to treat only reduced ranges of the angle of attack and the relative speed between the air flow and the aircraft.

SUMMARY OF THE INVENTION

Also, the purpose of this invention is to overcome the drawbacks of the prior art by proposing an air discharge device that makes it possible to limit the appearance of the separation phenomenon at a leading edge of an aircraft on ranges of angle of incidence, speed of the airplane, and the greater engine speed in flight, as well as on ranges of direction and relative wind speed that are higher on the ground.

For this purpose, the invention has as its object an aircraft leading edge that is extended by an aerodynamic surface at which flows an aerodynamic flow and where air discharges are arranged for the purpose of preventing the separation of said aerodynamic flow, whereby the air discharges are arranged in at least two rows that are essentially parallel to the leading edge and in an offset manner for at least two consecutive rows, characterized in that it comprises at least one block that is inserted between two walls that form the aerodynamic surface, whereby said block comprises, on the one hand, an outside surface in the extension of the aerodynamic surface, a first inclined surface that is in contact with the first wall that forms the aerodynamic surface and a second inclined surface that is in contact with the second wall that forms the aerodynamic surface, and, on the other hand, projecting and/or hollow shapes that are made at inclined surfaces and that are arranged in an alternating fashion from one surface to the next, allowing air to pass on both sides of the aerodynamic surface.

BRIEF DESCRIPTION OF THE DRAWING FIGURES

Other characteristics and advantages will emerge from the following description of the invention, a description that is provided only by way of example, relative to the accompanying drawings in which:

FIG. 1A is a perspective view that illustrates the separation zone at the time of takeoff, FIG. 1B is a perspective view that illustrates the separation zone during a wind gust, FIG. 2 is a perspective view that illustrates an air intake according to the invention, FIG. 3A is a top view that illustrates the arrangement of the air discharges according to a first variant of the invention, FIG. 3B is a top view that illustrates the arrangement of the air discharges according to another variant of the invention, FIG. 3C is a top view that illustrates the arrangement of the air discharges according to another variant of the invention, FIG. 4 is a cutaway of an air intake of a nacelle that illustrates the air discharges, FIG. 5 is a cutaway of the wall of the pipe of a nacelle that illustrates in detail a block that comprises air discharges according to an embodiment, FIG. 6 is a perspective view that illustrates the block of FIG. 5, and FIG. 7 is a front view that illustrates an air intake of an aircraft nacelle.

DETAILED DESCRIPTION OF THE INVENTION

FIGS. 1A and 1B show an aircraft propulsion system that comprises a nacelle 10 in which a power plant that is connected by means of a mast 12 to the rest of the aircraft is arranged essentially concentrically. Hereinafter, the longitudinal axis 14 corresponds to the shaft of the power plant.

The nacelle 10 comprises a first wall 16 that defines a pipe, a second so-called outside wall 18, and a lip 20 that connects the first wall 16 and the second wall 18 that defines an air intake into which an air flow penetrates.

A first part of the air flow that penetrates into the air intake, called primary flow, passes through the power plant to assist in the combustion, whereas a second part, called a secondary flow, driven by a fan, flows into an annular pipe that is delimited by the first wall of the nacelle and the outside wall of the power plant.

The lip 20 of the nacelle comprises a leading edge 22 that corresponds to the front part of the nacelle.

Even if it is described as applied to a nacelle, the invention can apply to all of the leading edges of an aircraft, whereby the latter can be curved in the case of a nacelle or essentially rectilinear in the case of a wing. In the absence of effects linked to the engine, the variation of the position of the separation line is due to the combined effects of the angle of attack and the speed of the aircraft.

Hereinafter, aerodynamic surface is defined as a surface of the aircraft that is in contact with the surrounding air, against which flows a stream of air in flight.

Based on certain characteristics of the air flow, a separation line can appear at the aerodynamic surface, whereby said separation line is more or less separated from the leading edge.

In the case of a nacelle, a separation line 24 can appear at the aerodynamic surface 26 that delimits the pipe 16 and that extends downstream from the leading edge 22. This separation line, more or less extended in the direction of the circumference of the pipe 16, can be positioned as illustrated in FIG. 1A at the low part of the aerodynamic surface 26, for example in the case of flight at a high angle of attack of the aircraft, at the top part of the aerodynamic surface 26, for example in the case of a stationary point with a high engine speed or at a lateral part of the aerodynamic surface 26 as illustrated in FIG. 1B, for example in the case of takeoff with a strong crosswind.

The position of the separation line 24 relative to the leading edge, and in particular the distance separating it from the leading edge, varies based on the flight conditions.

Thus, for example, the higher the angle of attack, the closer this separation line comes to the front part (leading edge) of the air intake, while the higher the speed of the aircraft or the engine speed, the farther it moves away. The separation line 24 extends over at least a portion of the circumference of the nacelle.

According to the invention, the aerodynamic surface 26 comprises air discharges 30 that are arranged in at least two rows 32 that are essentially parallel to the leading edge 22, whereby the air discharges 30 are arranged in an offset manner in a direction that is perpendicular to the longitudinal axis, for at least two consecutive rows. As illustrated in FIGS. 3A and 3B, in the case of two rows, the air discharges are alternating.

The fact of arranging air discharges 30 in several rows that are essentially parallel to the leading edge makes it possible to increase the width of the band that is treated by the air discharges and allows the fluctuations of the separation line within said range.

The discontinuity of the air discharges makes it possible to reduce the flow rate that is necessary relative to a configuration with several continuous slots that extend in the direction of flow over the entire range.

Furthermore, the fact of arranging air discharges 30 in an offset manner from one row to the next makes it possible for the air flow that exits from a first discharge arranged in an upstream row not to disturb the air discharge that is arranged at a downstream row. Finally, this alternating arrangement maximizes the favorable effect of vortices generated with each port discontinuity on the stabilization of the flow.

As illustrated in FIGS. 3A to 3C, the air discharges 30 can have different cross-section shapes.

Thus, as illustrated in FIG. 3A, the air discharges 30 can have a disk sector shape, whereby the shapes are all oriented in the same way from one row to the next or in a reversed manner from one row to the next, as illustrated in FIG. 3A.

According to another variant, the air discharges 30 can have a square or rectangular section as illustrated in FIGS. 3B and 3C.

The air discharges are arranged in two rows, as illustrated in FIGS. 3A and 3B, or in three rows or more as illustrated in FIG. 3C. In addition, the distance between the rows can be constant or can vary between two consecutive rows.

If appropriate, the rows could have discharges that are all identical or different based on the rows or zones of the leading edge.

If appropriate, the rows can extend over the entire circumference of the nacelle or over at least a portion of the circumference, according to the configuration and the operational field of the aircraft and after identification of the most at-risk zones with regard to the separation phenomena.

The discharge shapes are adapted so that the discharging air is injected with an inclined orientation close to the aerodynamic surface. By way of indication, the injected air forms an angle that varies from 5 to 45° relative to the aerodynamic surface.

The air flow is adjusted so as to prevent the separation of the aerodynamic flow.

According to the variants, the air can be sampled either in the engine at the primary flow or in the nacelle at the secondary flow, or directly from the outside via one or more scoops, or at the level of pneumatic de-icing of the leading edge, once the air is cooled by heat exchange with the cold surfaces to be de-iced.

According to another characteristic of the invention, the device comprises means for distributing the air and orienting it toward certain discharges based on requirements. Thus, the device of the invention makes it possible to select the treated zone(s) and comprises valves that make it possible to orient the flow of injected air toward certain sectors of the air intake.

By way of example, in low-speed flight, only the lower part of the air intake actually needs to be supplied. The pilot then controls the opening of valves to supply the air discharges that are arranged in the lower part of the air intake.

FIGS. 4, 5 and 6 show an embodiment of the device according to the invention that is applied to a nacelle.

The nacelle comprises a wall that forms the pipe 16, a wall 18 that forms the outside surface, a lip 20, and a front frame 34 that connects the walls 16 and 18 and supports the lip 20. Different configurations can be considered for ensuring the connection between these different elements.

According to the invention, the device comprises at least one block 36 that is inserted between two walls that form the aerodynamic surface, in the illustrated example between the wall that forms the lip 20 and the wall that forms the pipe 16, whereby said block comprises—at the surfaces in contact with the wall 16 and the lip 20—projecting and/or hollow shapes allowing air to pass from the inside zone of the nacelle to the outside zone on both sides of said block 36.

For the description, the inside zone of the nacelle is called the zone that is delimited by the walls 16 and 18 and the lip 20. The outside zone comprises in particular the stream of air that flows in the pipe 16.

The projecting and/or hollow shapes of the block in contact with the lip 20 form a first row of air discharges, projecting and/or hollow shapes of the block in contact with the wall 16 forming a second row of air discharges.

As illustrated in FIGS. 4, 5 and 6, the air discharges are of the leveling type. Thus, the block 36 comprises an outside surface 38 in the extension of the aerodynamic surface 26, a first inclined surface 40 in contact with the wall 16 that forms an acute angle with the outside surface 38, and a second inclined surface 42 that is in contact with the lip 20 that is essentially parallel to the first inclined surface 40. The slope of the first and second surfaces 40 and 42 makes it possible to adjust the angle of inclination of the air flow that is injected via the air discharges 30.

The hollow and/or projecting shapes are made at inclined surfaces 40 and 42 and emerge, on the one hand, at the outside surface 38, and, on the other hand, at the inside zone, whereby the projecting and/or hollow shapes are arranged in an alternating fashion from one surface to the next.

According to an enhanced embodiment, the block 36 comprises a thin part 44 that extends under the lip 20 and an inside surface 46 with an offset to house a part of the wall 16. In this case, the first series of projecting and/or hollow shapes extends from the surface of the part 44 that is in contact with the lip 20 up to the outside surface 38, and the second series of projecting and/or hollow shapes extends from the inside surface 46 up to the outside surface 38.

The block 36 can comprise a single part that extends over at least one part of the circumference of the nacelle or can comprise several sections placed end to end and extending over at least a part of the circumference.

According to the variants, the device can comprise one block 36 or several blocks 36 that may or may not be coupled in the direction of the longitudinal axis.

According to one embodiment, the front frame 34 and the lip 20 delimit a zone that can be compartmented so as to separate the air supply of the discharges 30. Thus, by supplying one or more compartment(s), it is possible to make certain air discharges active and not others.

The invention claimed is:

1. An aircraft leading edge, comprising:
an extended aerodynamic surface (26) at which flows an aerodynamic flow; and
air discharges (30) arranged at the aerodynamic surface for preventing separation of said aerodynamic flow, the air discharges (30) being arranged in at least two rows (32) that are essentially parallel to the leading edge (22) and in an offset manner for at least two consecutive rows, the air discharges comprising at least one separate block (36) inserted between two walls that form the aerodynamic surface (26), said block comprising an outside surface (38) in an extension of the aerodynamic surface (26), a first inclined surface (40) that is in contact with a first wall that forms the aerodynamic surface and a second inclined surface (42) that is in contact with a second wall that forms the aerodynamic surface, and at least one of projecting or cutout shapes that are made at the inclined surfaces (40, 42) and that are arranged in an alternating fashion from one surface to the next, allowing air to pass on both sides of the aerodynamic surface (26).

2. The aircraft leading edge according to claim 1, wherein shapes of the discharges (30) are adapted so that the discharging air is injected with an inclined orientation that is close to the aerodynamic surface.

3. The aircraft leading edge according to claim 2, wherein the aircraft leading edge further comprises means for distributing the air and orienting it toward certain discharges.

4. The aircraft leading edge according to claim 1, wherein the aircraft leading edge further comprises means for distributing the air and orienting it toward certain discharges.

5. The aircraft leading edge according to claim 1, wherein the air discharges (30) have a disc sector shape.

6. The aircraft leading edge according to claim 5, wherein the disc sector shapes are all oriented in a same way from one row to the next.

7. The aircraft leading edge according to claim 5, wherein the disc sector shapes are all oriented in a reversed manner from one row to the next.

8. The aircraft leading edge according to claim 1, wherein the air discharges (30) have a square shape.

9. The aircraft leading edge according to claim 1, wherein the air discharges (30) have a rectangular shape.

10. The aircraft nacelle according to claim 1, wherein the air discharges (30) have a square shape.

11. The aircraft nacelle according to claim 1, wherein the air discharges (30) have a rectangular shape.

12. An aircraft nacelle that comprises:
a lip (20) that connects an outside surface (18); and
a pipe (16) inside of which is placed a power plant, wherein said lip (20) forms a leading edge that is extended by said pipe (16) at which are arranged air discharges (30) that are arranged in at least two rows (32) that are essentially parallel to the leading edge (22) and in an offset manner for at least two consecutive rows, the air discharges comprising at least one separate block (36) that is inserted between two walls that form said pipe (16),
said block comprises an outside surface (38) in an extension of a surface of said pipe (16), a first inclined surface (40) in contact with a first wall that forms said pipe (16), and a second inclined surface (42) in contact with a second wall that forms said pipe (16), and
at least one of projecting or cutout shapes that are made at the inclined surfaces (40, 42) and that are arranged in an alternating fashion from one surface to the next, allowing air to pass.

13. The aircraft nacelle according to claim 12, wherein the aircraft nacelle comprises at least one block (36) between the wall that forms the lip (20) and the wall that forms the pipe (16).

14. The aircraft nacelle according to claim 13, wherein the aircraft nacelle further comprises a zone inside the lip (20) that is compartmented so as to separate the supply of air of the discharges (30).

15. The aircraft nacelle according to claim 12, wherein the aircraft nacelle further comprises a zone inside the lip (20) that is compartmented so as to separate the supply of air of the discharges (30).

16. The aircraft nacelle according to claim 12, wherein the air discharges (30) have a disc sector shape.

17. The aircraft nacelle according to claim 16, wherein the disc sector shapes are all oriented in a same way from one row to the next.

18. The aircraft nacelle according to claim 16, wherein the disc sector shapes are all oriented in a reversed manner from one row to the next.

19. An aircraft leading edge, comprising:
   an extended aerodynamic surface (26) at which flows an aerodynamic flow; and
   air discharges (30) having different cross-sectional shapes arranged at the aerodynamic surface for preventing separation of said aerodynamic flow, the air discharges (30) being arranged in at least two rows (32) that are essentially parallel to the leading edge (22) and in an offset manner for at least two consecutive rows, the air discharges comprising at least one separate block (36) inserted between two walls that form the aerodynamic surface (26), said at least one separate block comprising:
   an outside surface (38) in an extension of the aerodynamic surface (26),
   a first inclined surface (40) that is in contact with a first wall that forms the aerodynamic surface,
   a second inclined surface (42) that is in contact with a second wall that forms the aerodynamic surface, and
   at least one of projecting or cutout shapes with the different cross-sectional shapes that are made at the inclined surfaces (40, 42) and that are arranged in an alternating fashion from one surface to the next, allowing air to pass on both sides of the aerodynamic surface (26).

20. The aircraft leading edge according to claim 19, wherein the different cross-sectional shapes are selected from a disk sector, a square or a rectangle.

\* \* \* \* \*

UNITED STATES PATENT AND TRADEMARK OFFICE
CERTIFICATE OF CORRECTION

PATENT NO. : 8,434,724 B2  Page 1 of 1
APPLICATION NO. : 12/745950
DATED : May 7, 2013
INVENTOR(S) : Chelin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 332 days.

Signed and Sealed this
Eighth Day of September, 2015

Michelle K. Lee
*Director of the United States Patent and Trademark Office*